3,411,351
FLUID MEASURING SYSTEM
Joseph Schwartz, Ossining, N.Y., assignor to Simmonds Precision Products, Inc., Tarrytown, N.Y., a corporation of New York
Filed Oct. 23, 1965, Ser. No. 503,436
2 Claims. (Cl. 73—149)

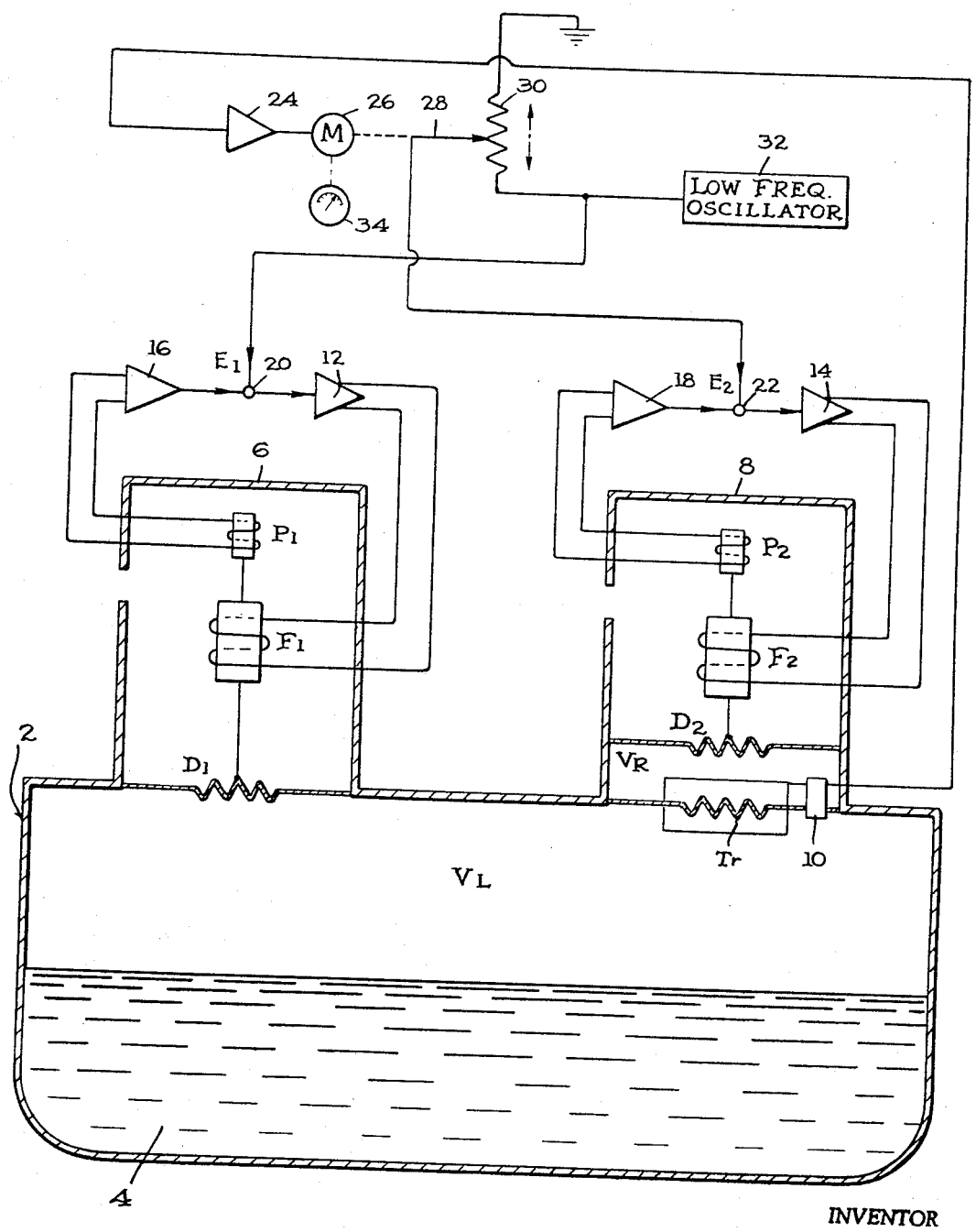

ABSTRACT OF THE DISCLOSURE

A fluid gauging system which derives liquid volume from pressure changes in the ullage volume within a container of liquid to be measured wherein a small reference chamber is connected to the main tank such that the gas composition and static pressure in the reference chamber is the same as that in the main tank containing the ullage space. A first transducer means is connected to the main tank for producing a continuous known change in the ullage volume while a second transducer means connected to the reference chamber provides a similar alternating volume change for pressure variations therein. By means of a servo loop including a differential pressure transducer connected between the tank volume and reference chamber volume, the alternating components of the ullage and reference gas pressures are made equal, the output signal necessary to bring about this null condition being an indication of the ullage volume and hence the volume of liquid in the container.

---

This invention relates to a fluid volume measuring system and, more particularly, a fluid measuring system which detects pressure changes within a fluid container and a reference container.

Accordingly, it is the object of this invention to provide a fluid gauging system which can operate in a zero gravity environment and which employs a rebalancing servo system for detection of pressure changes within a fluid container.

It is another object of this invention to provide a fluid gauging system employing pressure detection means which is immune to high noise and vibration levels.

According to one aspect employing the principles of this invention, there is provided a gauging system based on the fact that a change in gas ullage volume causes a directly related predictable change in gas pressure and from changes due to the latter, the actual ullage volume can be derived. A force-balance transducer is provided for producing a continuous known change in volume and pressure in the ullage volume. A second force-balance transducer is provided in a reference chamber connected to the main tank in such a way that the gas composition and static pressure in the reference chamber are the same as in the main tank ullage space. The second force-balance transducer in the reference space sets up similar conditions of alternating volume and pressure variations. By means of a differential pressure transducer between the two volumes and a servo loop, the alternating components of ullage and reference gas pressure are made equal. The pressure change in a gas compressibility system is given by the gas law equation:

$$\Delta P = -\gamma \frac{P}{V} \Delta V$$

Solving for the ullage volume (V) requires accurate knowledge of the static pressure (P), the dynamic pressure ($\Delta P$) and the gas constant ($\gamma$) which is the ratio of the specific heats at constant pressure and at constant volume. The right hand side of the above equation can be expressed for the ullage space and for the reference space and set equal. Cancelling the remaining equal parameters leaves the relationship:

$$V_u = V_r \frac{\Delta V_u}{\Delta V_r}$$

which shows that the ullage gas volume ($V_u$) can be determined if the reference volume ($V_r$), the ullage force-balance transducer volume displacement ($\Delta V_u$) and the reference force-balance transducer volume displacement ($\Delta V_r$) is known. The reference volume is known because it is designed as a predetermined parameter. Further, the ullage force-balance transducer control signal is known leaving only the reference force-balance transducer control signal to be measured, and the output signal from the latter is an indication of the volume of fluid being measured.

Further objects and advantages will become apparent after studying the following specification and drawing, in which there is shown a schematic illustration of a fluid container equipped with the gauging system employing the principles of this invention.

Referring now to the drawing, there is shown a tank 2 partially filled with a fluid 4 and having an ullage volume $V_L$. Mounted on top of the tank are two enclosures 6 and 8, both of which are open to the atmosphere. Within the enclosure 6 and mounted on the top wall of the container 2 is a diaphragm $D_1$ and connected thereto is a force-balance transducer $F_1$ of known design. A position transducer $P_1$ of known design is coupled with the transducer $F_1$ for measuring the position thereof. Within the enclosure 8 and mounted on top of the container 2 is a differential pressure transducer $T_r$ above which is a small reference volume $V_r$ which is sealed off from the remaining portion of the enclosure 8. An acoustic filter 10 connects the reference volume $V_r$ with the ullage $V_L$ in the tank 2 for equalizing pressure, temperature and composition between the two volumes. The filter 10, however, does not transmit the low frequency oscillation but only DC pressures. Mounted on top of the reference volume $V_R$ is a second diaphragm $D_2$ similar to the diaphragm $D_1$. Connected to the diaphragm $D_2$ is a second force-balance transducer $F_2$ and for measuring the position of the transducer $F_2$ there is coupled therewith a position transducer $P_2$. Each of the diaphragms $D_1$ and $D_2$ are vibrated by respective transducers $F_1$ and $F_2$ which, in turn, are connected to a low frequency signal source to be discussed below. Each of the transducers $F_1$ and $F_2$ are connected to suitable amplifiers 12 and 14 and the transducers $P_1$ and $P_2$ are similarly connected to respective amplifiers 16 and 18. The position transducer $P_1$ determines the position of the force-balance transducer $F_1$ which drives the diaphragm $D_1$, while the position transducer $P_2$ determines the position of the force-balance transducer $F_2$ which drives the diaphragm $D_2$. The amplifiers 16 and 12, corresponding to the transducer signals in enclosure 6, are connected to a reference point 20 giving rise to a reference voltage $E_1$. Thus, a servo loop is closed around the two transducers $P_1$, $F_1$ so that the amplitude swing of the diaphragm $D_1$ is determined by the swing of the reference voltage $E_1$. Similarly, amplifiers 14, 18, corresponding to the transducers $P_2$, $F_2$ in the enclosure 8, are fed to a second reference point 22 providing a reference voltage $E_2$. Thus, an amplitude of $D_2$ is determined in the same manner as $D_1$ by the voltage of $E_2$.

A differential pressure transducer $T_r$ is shown to be positioned between the reference volume $V_R$ in enclosure 8 and the main tank 2. Connected to the transducer $T_r$ is an amplifier 24, which drives a motor 26 for adjusting a wiper 28, connected to $E_2$, in order to rebalance a potentiometer 30 connected to $E_1$ and having a voltage $\alpha(E_2/E_1)$. Indicator 34 is connected to the moving wiper 28 of potentiometer 30 through the servo motor 26, for indicating the amount of adjustment to the wiper. A source signal is provided by a low frequency oscillator 32. It will be seen that the transducers $F_1$ and $F_2$ are connected to the low frequency oscillator 32 by means of amplifiers 12 and 14, and these transducers, in turn, drive their respective diaphragms $D_1$ and $D_2$ in accordance with the signal from oscillator 32. Voltage $E_1$ is the summation of the oscillator output and the amplified output of $P_1$ and will be, therefore, the null point input to servo amplifier 12. Voltage $E_2$ is the summation of the potentiometer voltage 28 and the amplified output of $P_2$ and will be, therefore, the null point input to servo amplifier 14.

The pressure variation $\Delta P_L$ in $V_L$ is proportional to $S_1 M_1 / V_L$ where $S_1$ is the area of $D_1$ and $M_1$ is the movement of $D_1$. Similarily, the pressure variation of $\Delta P_R$ is proportional to $S_2 M_2 / V_R$ where $M_2$ is the movement of $D_2$ and $S_2$ in the area of $D_2$. If the reference voltage $E_1$ is servoed until the differential pressure transducer $T_R$ indicates zero, then $$\frac{S_1 E_1}{S_2 E_2} = K \frac{V_L}{V_R} = K_1 \frac{1}{\alpha}$$

and $$V_L = K_3 \frac{V_R}{\alpha}$$

If $V_L$ is the ullage space of the fuel tank under zero gravity conditions then the signal required to null the rebalancing potentiometer 30 will indicate the volume of the ullage gas in the tank 2 and hence the volume of the fluid 4 can be determined. Compared to an acoustic-type system, this invention has the advantage of using a null balancing system instead of microphones for detection of pressure changes within the tank 2. This arrangement allows for immunity to high noise and vibrational levels.

Although several embodiments of the invention have been dipicted and described, it will be apparent that these embodiments are illustrative in nature and that a number of modifications in the apparatus and variations in its end use may be effected without departing from the spirit or scope of the invention as defined in the appended claims.

What is claimed is:
1. In a fluid gauging system comprising a main tank having a volume of fluid therein and a reference tank connected to said main tank and having an acoustic filter connected therebetween, a differential pressure sensitive transducer positioned between said reference tank and said main tank, first transducer sensing means connected to said main tank, second transducer sensing means connected to said reference tank, circuit means for establishing a first reference voltage source and a second reference voltage source in response to said first and second transducer sensing means, an oscillating energy source for said circuit, said circuit means including a rebalancing potentiometer, means responsive to said differential pressure transducer for adjusting said potentiometer to establish a null between said first reference voltage and said second reference voltage and indicator means responsive to said adjustment.

2. In a fluid measuring system comprising a main tank having a volume of fluid therein, a first diaphragm positioned on said tank, first transducer means connected with said diaphragm, an oscillating energy source, a first circuit including said first transducer means and said energy source for establishing a first reference voltage source, a reference tank positioned on said main tank and having an acoustic filter connected therebetween, a second diaphragm positioned on said reference tank and having second transducer means connected thereto, a second circuit including said second transducer means and said energy source for establishing a second reference voltage source, a differential pressure transducer connected between said main tank and said reference tank, a third circuit including said differential pressure transducer and having a rebalancing potentiometer connected to said energy source for connecting said first and second reference voltage sources, means responsive to the signal from said differential pressure transducer for adjusting said rebalancing potentiometer to a null value and indicator means responsive to said adjustment.

References Cited
UNITED STATES PATENTS

| | | | |
|---|---|---|---|
| 2,116,636 | 5/1938 | Neumann | 73—149 XR |
| 2,285,151 | 6/1942 | Firestone | 73—149 |
| 2,691,304 | 10/1954 | Smith et al. | 73—290 |
| 2,849,881 | 9/1958 | Anderson. | |

S. CLEMENT SWISHER, *Acting Primary Examiner.*

J. NOLTON, *Assistant Examiner.*